United States Patent [19]

Trebaol

[11] 4,424,842
[45] Jan. 10, 1984

[54] VEHICLE WHEEL HAVING SAFETY TREAD

[76] Inventor: Francois P. Trebaol, 6113 Piedmont Ave., Los Angeles, Calif. 90042

[21] Appl. No.: 397,211

[22] Filed: Jul. 12, 1982

Related U.S. Application Data

[63] Continuation-in-part of Ser. No. 268,862, Jun. 1, 1981, abandoned.

[51] Int. Cl.³ .............................................. B60C 17/00
[52] U.S. Cl. .............................. 152/158; 152/330 RF; 152/405; 152/411; 301/63 DS; 301/65; 301/97
[58] Field of Search ............. 152/158, 330 L, 330 RF, 152/386, 396, 402, 405, 411; 301/63 DS, 65, 97

[56] References Cited

U.S. PATENT DOCUMENTS

| | | | |
|---|---|---|---|
| 2,879,821 | 3/1959 | DeMayo | 152/158 |
| 2,989,108 | 6/1961 | Gore | 152/158 |
| 3,025,898 | 3/1962 | Opel | 152/158 |
| 3,180,391 | 4/1965 | Lindley | 152/158 |
| 3,288,193 | 11/1966 | Mantzel | 152/158 X |

Primary Examiner—William A. Powell
Assistant Examiner—Thomas Bokan
Attorney, Agent, or Firm—Christie, Parker & Hale

[57] ABSTRACT

A vehicle wheel comprises two circular wheel halves, each having a portion of a rim, approximately one-half of the circumference of a safety tread and means for attaching the tread portion to the rim portion. The parts of the tread interface with each other on a bias so they can be brought together and separated by relative movement having a component transverse to the central axis of the wheel.

8 Claims, 5 Drawing Figures

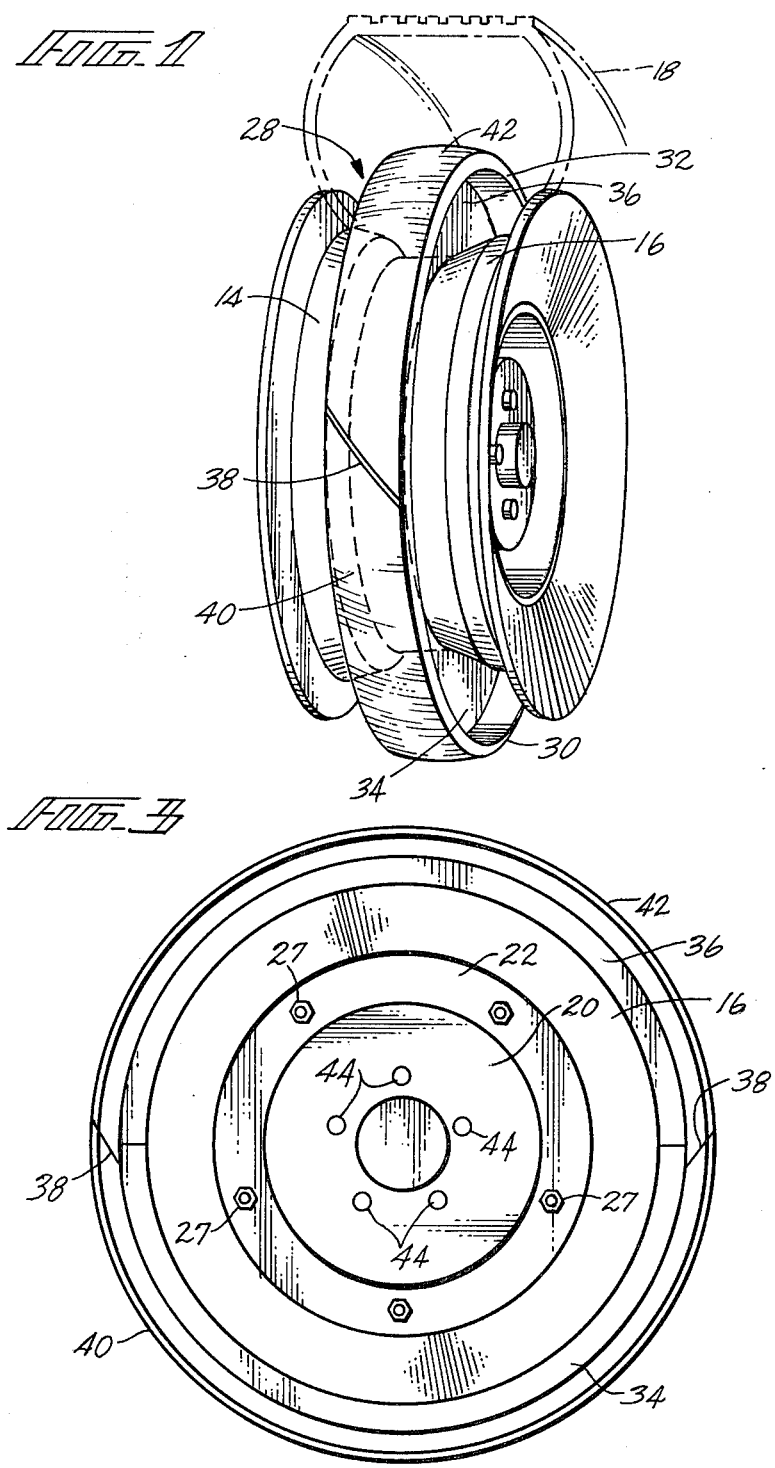

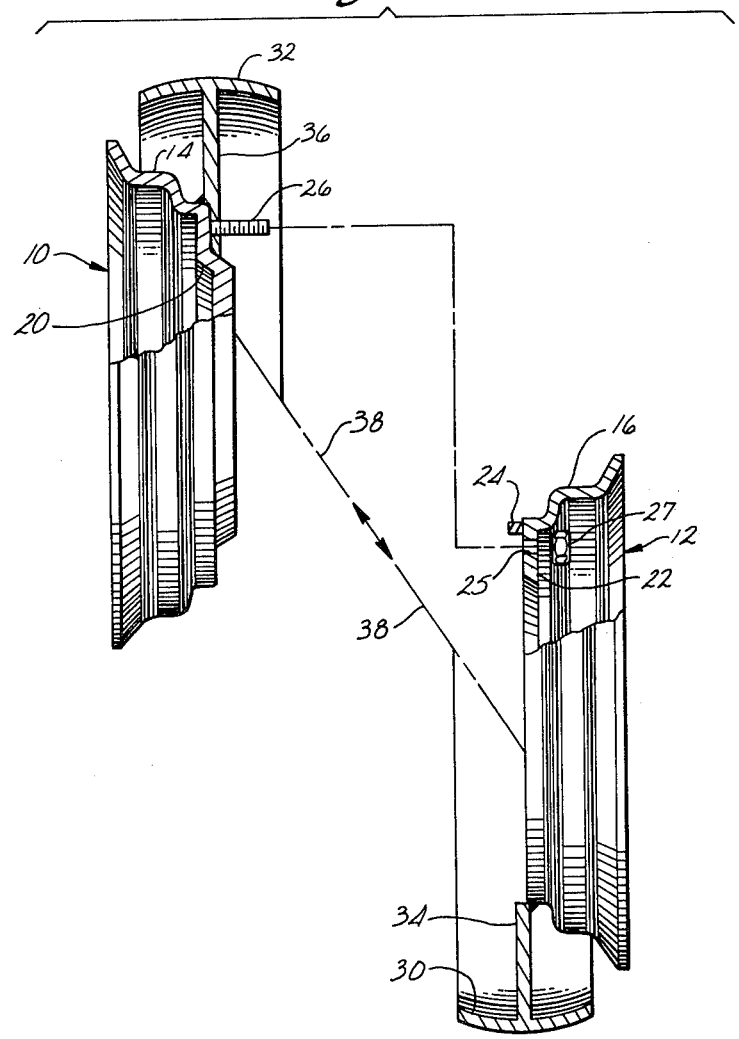

VEHICLE WHEEL HAVING SAFETY TREAD

The application is a continuation-in-part of Ser. No. 268,862 filed June 1, 1981, now abandoned.

BACKGROUND OF THE INVENTION

This invention relates to vehicle wheels adapted to receive pneumatic tires and, more particularly, to such a wheel having an inner safety tread.

It is known to provide a vehicle wheel with an annular safety tread having a larger diameter than the rim of the wheel for protection in case the tire carried by the wheel becomes deflated. Such a safety tread is secured to the rim of the wheel between its edges in radially outward spaced relationship therefrom to prevent the edges of the rim from cutting the tire casing when the tire suffers a loss of air.

It is difficult to mount a tire on a wheel having a safety tread because of the large diameter required of the tread. To facilitate tire mounting, such a wheel is generally constructed of at least three parts; namely, an inside wheel half, an outside wheel half, and a safety foot assembly clamped between the wheel halves for ease of insertion of the safety foot into the tire casing. The safety tread is sometimes divided circumferentially into three parts, which can be separately placed inside the tire casing. The numerous parts of a wheel having a safety tread complicate the tire mounting procedure.

SUMMARY OF THE INVENTION

The invention permits a tire more easily to be mounted on a wheel having a safety tread.

According to the invention, a vehicle wheel comprises first and second circular wheel halves releasably secured together and an annular tread divided circumferentially into two or more parts that interface with each other on a bias so they can be brought together and separated by relative movement having a component transverse to the central axis of the wheel. One part of the foot is secured to one wheel half and the other part of the foot is secured to the other wheel half. As a result of the biased interface between the parts of the foot, the last part of the foot to enter the tire casing may readily be inserted therein by wedge action.

BRIEF DESCRIPTION OF THE DRAWINGS

The features of a specific embodiment of the best mode contemplated of carrying out the invention are illustrated in the drawings, in which:

FIG. 1 is a perspective view of a vehicle wheel incorporating the principles of the invention;

FIG. 2 is a side view of the parts of the wheel of FIG. 1 separated from each other;

FIG. 3 is a front view of the wheel of FIG. 1;

DETAILED DESCRIPTION OF THE SPECIFIC EMBODIMENT

Figure 4:
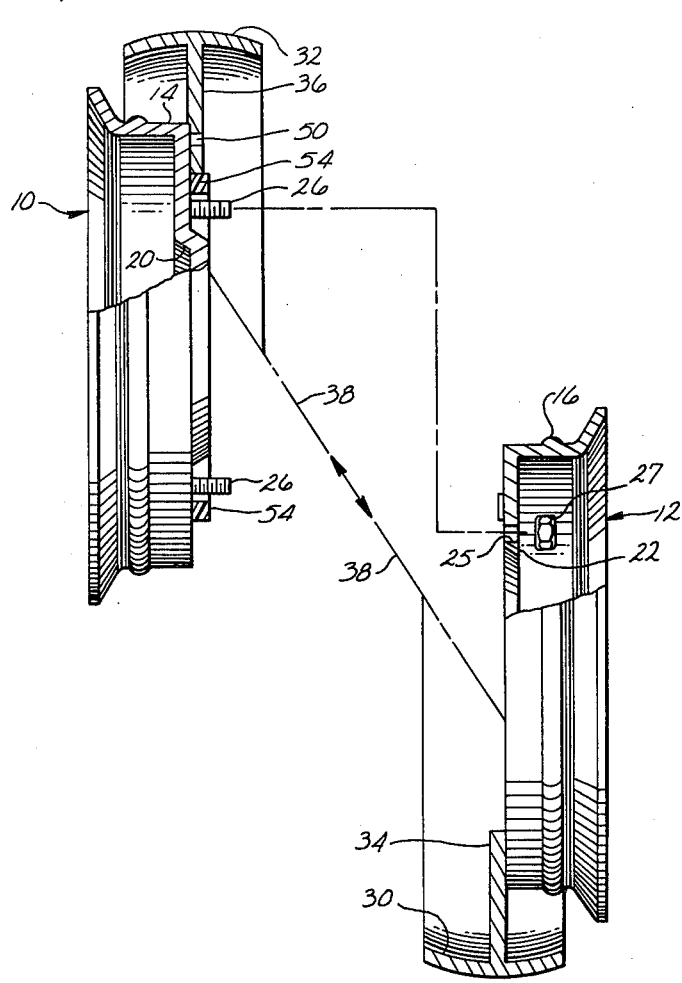
FIG. 4 is a side view of the parts of another embodiment of the wheel of FIG. 1 separated from each other.

In the drawings, a vehicle wheel comprises a circular wheel half 10 and a circular wheel half 12. Wheel half 10 has an inside rim part 14 and wheel half 12 has an outside rim part 16. Together, rim parts 14 and 16 form a rim adapted to receive a pneumatic tire 18, represented in phantom in FIG. 1. Wheel half 10 also has a circular hub 20 within rim part 14. Wheel half 12 also has an annular inwardly extending flange 22 within rim part 16. The periphery of hub 20 is recessed to receive flange 22 and to permit the central portion of hub 20 to fit snuggly into the annular region surrounded by flange 22. The mating surfaces of flange 22 and the central portion of hub 20 are preferably tapered at a small angle to the central axis of the wheel, e.g., 3° as illustrated in FIG. 2. Wheel half 10 has threaded bolts 26 fixedly mounted in holes in the recessed periphery of hub 20 and extending therefrom parallel to the central axis of wheel half 10. Wheel half 12 has holes 25 aligned with bolts 26. Wheel halves 10 and 12 are releasably secured and clampled by nuts 27 screwed onto bolts 26, when they lie in holes 25 with flange 22 and hub 20 mated. A sealing ring 24, which could be made, for example, of neoprene rubber is bonded to the surface of flange 22 where it joins rim part 16. As a result, an air-tight seal is formed at the interface of rim parts 14 and 16 when wheel halves 10 and 12 are secured together so that the wheel can be used with tubeless tires.

An annular safety tread or foot 28 is divided circumferentially into approximately equal interfacing parts 30 and 32. Tread 28 has a larger diameter than the rim. Part 30 is attached to rim part 16 by a radially outward extending web 34 and part 32 is attached to rim part 14 by a radially outward extending web 36 so that webs 34 and 36 and parts 30 and 32 are aligned with each other when wheel halves 10 and 12 are secured together. Tread 28 has edges that are curved somewhat toward the edges of the wheel rim to increase the area of contact with a deflated tire. Webs 34 and 36 join rim parts 14 and 16 midway between the curved edges. In the embodiment of FIGS. 2 and 3, rim part 14, hub 20, tread part 32, and web 34 are welded together or cast as a unit to form a one-piece construction. Similarly, rim part 16, flange 22, tread part 30, and web 36 are welded together or cast as a unit to form a one-piece construction.

Tread parts 30 and 32 interface with each other on a bias, as depicted in the drawings at 38, so that they can be brought together and separated by relative movement having a component transverse to the central axis of the wheel. In this way, after one rim part has been inserted into the tire casing, the other rim part can be slipped therein at an angle to the central axis of the wheel by wedging action between the interfaces of the foot parts. The bias of the interface on both sides of the wheel halves runs in the same direction, as depicted in FIG. 3. In other words, assuming that parts 30 and 32 are the same circumferential length in the middle, the right-hand edge of part 30, as viewed in FIG. 1, has a shorter circumferential length than the right-hand edge of part 32. Conversely, the left-hand edge of part 30 has a longer circumferential length than the left-hand edge of part 32.

Rubber treads 40 and 42 are bonded to the outer surface of parts 30 and 32, respectively, to prevent friction or slippage of the tire relative to the safety tread.

To install the described wheel, wheel half 10 is first mounted on the vehicle by bolting hub 20 onto the brake drum of the vehicle. The lugs of the vehicle pass through holes 44 in hub 20. Then a tire is mounted on rim part 14 with part 32 inside the tire casing. Finally, wheel half 12 is brought toward wheel half 10 out of alignment with its central axis. After the interfacing surfaces of tread parts 30 and 32 contact each other, part of the force exerted on wheel half 12 parallel to the central axis of the wheel is transferred by the wedging action between the interfacing surfaces of tread parts 30 and 32 in a direction transverse to the central axis, thereby sliding foot part 30 up into the tire casing while bringing wheel half 12 into axial alignment with wheel half 10 as flange 22 comes into abutment with the recessed periphery of hub 20.

It is easier to mount a tire on the described wheel because there are only two parts and these parts are brought into engagement with each other and the tread parts are inserted into the tire casing with the aid of the wedging action of the biased interfaces of tread parts 30 and 32.

Figure 5:
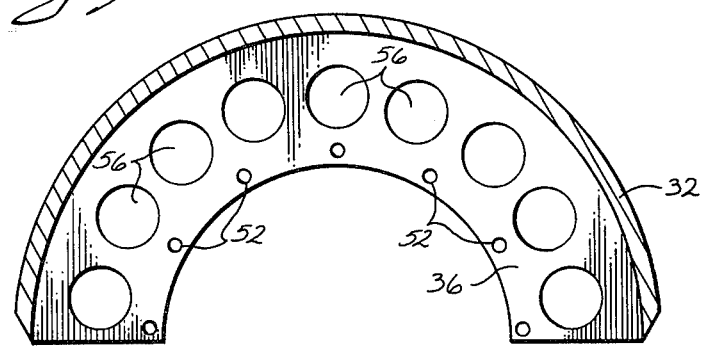
FIG. 5 is a front view of the tread of FIG. 4.

In the embodiment of FIGS. 4 and 5, like reference numerals are used to identify like parts. In this embodiment, tead 28 is a separate piece clamped between wheel halves 10 and 12. A plurality of threadless lugs 50 extend from hub 20 toward flange 22. Lugs 50 are arranged in a circle around bolts 26. As illustrated in FIG. 5, web 36 has a plurality of bores for receiving respective lugs 50 on hub 20. Similarly, web 34 has a plurality of bores for receiving the remaining lugs 50 on hub 20. Lugs 50 and bores 52 serve to properly position, i.e., center tread 28 on the wheel and hold it in place until assembly is complete. An annular seal 54, such as for example neoprene rubber is secured to hub 20 between tread 28 and bolts 26 to prevent air leakage from the tire through the interface between hub 20 and flange 22. Holes 56 are formed in webs 34 and 36 to reduce the weight of tread 28. To install this embodiment of the wheel, wheel half 10 may be placed on the ground, then the tire may be placed around wheel half 10. Next, tread parts 30 and 32 are inserted into the interior of the tire so that bores 52 receive lugs 50. Finally, wheel half 12 is brought against webs 34 and 36 so holes 25 receive bolts 26 and nuts 27 are screwed onto bolts 26 in order to hold the parts of the wheel together.

Safety tread 28 of FIGS. 4 and 5, which is not welded to the wheel, could alternatively be divided into three or four pieces, as tire mounting requirements may dictate.

What is claimed is:

1. A vehicle wheel adapted to receive a pneumatic tire, the wheel comprising:
    a first circular wheel half having an inside part of a rim adapted to receive a pneumatic tire;
    a second circular wheel half having an outside part of the rim;
    an annular tread having a larger diameter than the rim and a central axis, the tread being divided circumferentially into two parts interfacing with each other on a bias so they can be brought together and separated by relative movement having a component transverse to the central axis, one part of the tread being secured to the first wheel half and the other part of the tread being secured to the second wheel half; and
    means for releasably securing the wheel halves together.

2. The wheel of claim 1, in which the one part of the tread is fixedly secured to the first wheel half to form a one-piece construction and the other part of the tread is fixedly secured to the second wheel half to form a one-piece construction.

3. The wheel of claim 2, in which the tread has edges curved toward the rim.

4. The wheel of claim 3, in which the one part of the tread is secured to the first wheel half by a web extending radially outward from the first wheel half to form a one-piece construction and the other part of the tread is secured to the second wheel half by a web extending radially outward from the second wheel half to the other part of the tread to form a one-piece construction.

5. A vehicle wheel having a hub for mounting the wheel on a vehicle, a rim for receiving a pneumatic tire, an annular tread having a larger diameter than the rim, and means for attaching the tread to the rim so the tread lies between the edges of the rim in radially outward space relationship therefrom, characterized in that the wheel comprises:
    a first circular wheel half having a portion of the rim including one edge thereof and a circular hub within the rim, the hub having a recessed periphery and a protruding central portion;
    a second wheel half having the remainder of the rim including its other edge and an annular inwardly extending flange defining a circular opening within the rim portion, the recessed periphery of the hub receiving the flange to permit the central portion of the hub to fit snugly into the annular region surrounded by the flange, the wheel halves being adapted to receive the tread attaching means; and
    means for releasably securing the wheel halves together.

6. The wheel of claim 5, characterized in that the halves of the tread have two interfaces on a bias, the bias of both interfaces running in the same direction.

7. The wheel of claim 5, in which the securing means comprises means for clamping the flange to the hub.

8. The wheel of claim 5, in which the surfaces of the recessed periphery and the flange are tapered to facilitate their alignment.

* * * * *